United States Patent
Kang et al.

(10) Patent No.: US 11,114,659 B2
(45) Date of Patent: Sep. 7, 2021

(54) NEGATIVE ELECTRODE SHEET AND SECONDARY BATTERY

(71) Applicant: Contemporary Amperex Technology Co., Limited, Fujian (CN)

(72) Inventors: Meng Kang, Ningde (CN); Yuliang Shen, Ningde (CN); Jiazheng Wang, Ningde (CN); Libing He, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 0 days.

(21) Appl. No.: 16/973,903

(22) PCT Filed: Oct. 14, 2019

(86) PCT No.: PCT/CN2019/110992
§ 371 (c)(1),
(2) Date: Dec. 10, 2020

(87) PCT Pub. No.: WO2020/078307
PCT Pub. Date: Apr. 23, 2020

(65) Prior Publication Data
US 2021/0249650 A1      Aug. 12, 2021

(30) Foreign Application Priority Data

Oct. 17, 2018   (CN) .......................... 201811209262.3

(51) Int. Cl.
| | | |
|---|---|---|
| H01M 4/36 | (2006.01) | |
| H01M 4/505 | (2010.01) | |
| H01M 4/525 | (2010.01) | |
| H01M 4/134 | (2010.01) | |
| H01M 4/133 | (2010.01) | |
| H01M 10/0525 | (2010.01) | |
| H01M 4/02 | (2006.01) | |

(52) U.S. Cl.
CPC ........... *H01M 4/366* (2013.01); *H01M 4/133* (2013.01); *H01M 4/134* (2013.01); *H01M 4/505* (2013.01); *H01M 4/525* (2013.01); *H01M 10/0525* (2013.01); *H01M 2004/021* (2013.01); *H01M 2004/027* (2013.01); *H01M 2004/028* (2013.01)

(58) Field of Classification Search
CPC ...... H01M 4/366; H01M 4/505; H01M 4/525; H01M 4/134; H01M 4/133; H01M 10/0525; H01M 2004/021; H01M 2004/027; H01M 2004/028
See application file for complete search history.

(56) References Cited

FOREIGN PATENT DOCUMENTS

| | | |
|---|---|---|
| CN | 101685853 A | 3/2010 |
| CN | 101916856 A | 12/2010 |
| CN | 105304902 A | 2/2016 |
| CN | 106058260 A | 10/2016 |
| CN | 108023064 A | 5/2018 |
| CN | 109494349 A | 3/2019 |
| JP | 2014229517 A | 12/2014 |
| WO | 2017212596 A1 | 12/2017 |

OTHER PUBLICATIONS

Search Report and Written Opinion dated Jan. 14, 2020 in corresponding International Application No. PCT/CN2019/110992; 14 pages.
Office Action dated Feb. 25, 2020 in corresponding Chinese Application No. 201811209262.3; 8 pages.

*Primary Examiner* — Carlos Barcena
(74) *Attorney, Agent, or Firm* — Maier & Maier, PLLC

(57) ABSTRACT

The present application provides a negative electrode sheet and a secondary battery. The negative electrode sheet includes a negative current collector and a negative electrode film provided on at least one surface of the negative current collector and comprising a negative active substance. The negative electrode sheet also satisfies: $0.3 \leq a \times (1.1/b + 0.02 \times c) \leq 6.0$, where a represents the specific surface area of the negative electrode film, and the unit is $m^2/g$; b represents the compaction density of the negative electrode film, and the unit is $g/cm^3$; c represents the cohesive force between the negative electrode film and the negative current collector, and the unit is N/m. The present application can make the negative electrode sheet have excellent dynamics performance, and meanwhile ensure that the secondary battery has good dynamics performance and cycle performance without sacrificing energy density.

20 Claims, No Drawings

NEGATIVE ELECTRODE SHEET AND SECONDARY BATTERY

CROSS-REFERENCE TO RELATED APPLICATIONS

This application is a National Stage of International Application No. PCT/CN2019/110992, filed on Oct. 14, 2019, which claims priority to Chinese Patent Application No. 201811209262.3, filed on Oct. 17, 2018, both of which are incorporated herein by reference in their entireties.

TECHNICAL FIELD

The application relates to the field of batteries, and in particular, to a negative electrode sheet and a secondary battery.

BACKGROUND

Rechargeable batteries are widely used in mobile phones, computers, household electric appliances, electric power tools and other fields due to outstanding characteristics of light weight, high energy density, no pollution, no memory effect, and long service life and the like. Rechargeable batteries are charged and discharged through the intercalation and de-intercalation of ions between the positive and negative active substance, where the design of the negative electrode sheet will directly affect the performance of the battery. How to rationally design the negative electrode sheet to obtain a battery with both dynamics performance and other electrochemical performance is a common problem in the industry at present.

SUMMARY

In view of the problems existing in the background, an object of the present application is to provide a negative electrode sheet and a secondary battery that enables the negative electrode sheet have excellent dynamics performance, and meanwhile ensures that the secondary battery has good dynamics performance and cycle performance without sacrificing energy density.

In order to achieve the above object, in a first aspect of the present application, the present application provides a negative electrode sheet, which comprises a negative current collector and a negative electrode film provided on at least one surface of the negative current collector and comprising a negative active substance. The negative electrode sheet further satisfies $0.3 \leq a \times (1.1/b + 0.02 \times c) \leq 6.0$; a represents a specific surface area of the negative electrode film, and a unit is $m^2/g$; b represents compaction density of the negative electrode film, and a unit is $g/cm^3$; c represents cohesive force between the negative electrode film and the negative current collector, and a unit is N/m.

In a second aspect of the present application, the present application provides a secondary battery, which comprises the negative electrode sheet according to the first aspect of the present application.

Compared with the prior art, the present application at least includes the following beneficial effects: by reasonably adjusting the relationship between the compaction density of the negative electrode film, the specific surface area of the negative electrode film and the cohesive force between the negative electrode film and the negative current collector, the present application can make the negative electrode sheet have excellent dynamics performance, and meanwhile ensure that the secondary battery has good dynamics performance and cycle performance without sacrificing energy density.

DETAILED DESCRIPTION OF EMBODIMENTS

Hereinafter a negative electrode sheet and a secondary battery according to the present application are described in detail.

Firstly, the negative electrode sheet according to the first aspect of the present application is described. The negative electrode sheet comprises a negative current collector and a negative electrode film provided on at least one surface of the negative current collector and comprising a negative active substance. The negative electrode sheet further satisfies $0.3 \leq a \times (1.1/b + 0.02 \times c) \leq 6.0$; a represents the specific surface area of the negative electrode film, and the unit is $m^2/g$; b represents the compaction density of the negative electrode film, and the unit is $g/cm^3$; c represents the cohesive force between the negative electrode film and the negative current collector, and the unit is N/m.

The negative electrode sheet needs to undergo the following four electrochemical processes during the charging process of the battery: (1) the active ions (such as lithium ions, sodium ions and the like) de-intercalated from the positive active material enter into the electrolyte, and are conducted from the surface of the positive porous electrode to the inside of pore channels of the negative porous electrode along with the electrolyte, so that a liquid phase conduction of the active ions is conducted inside the pore channels of the porous negative electrode; (2) the active electrons are conducted to the surface of the negative active substance through the negative current collector; (3) the active ions pass through the SEI film on the surface of the negative electrode and enter the surface of the negative active substance to obtain electrons to complete the charge exchange; (4) the active ions are conducted from the surface of the negative active substance to the bulk phase of the negative active substance through solid phase conduction.

In the above-mentioned electrochemical process, the factors that affect ion conduction and electron conduction will directly affect the dynamics performance of the negative electrode sheet, thereby affecting the dynamics performance and cycle performance of the battery.

Firstly, the conduction of active ions from the surface of the positive porous electrode to the inside of pore channels of the negative porous electrode requires the electrolyte to fully infiltrate the pores of the negative porous electrode. Theoretically, the greater the compaction density of the negative electrode film, and the fewer and smaller the pores of the negative porous electrode, the more unfavorable the entry of electrolyte, and the higher the liquid phase conduction resistance of active ions inside the pore channels of the negative porous electrode, thereby affecting the liquid phase potential of the negative electrode during the rapid charging process of the battery.

Secondly, the electrolyte needs to have as much contact area as possible with the surface of the negative active substance, so that the active ions have more intercalation channels. Theoretically, the larger the specific surface area of the negative electrode film, the more opportunities for electrolyte to contact the surface of the negative active substance, the more intercalation channels for the active ions, the easier the intercalation process of the active ions, and the smaller the charge exchange impedance between the active ions and electrons at the same time.

Thirdly, only when the electrons pass through the negative current collector and reach the surface of the negative active substance, can the active ions exchange charge with the electrons and being intercalated into the bulk phase of the negative active substance. Therefore, the electron conduction capability of the negative electrode sheet also affect the intercalation speed of the active ions, and then affects the dynamics performance of the negative electrode sheet. Theoretically, the cohesive force between the negative electrode film and the negative current collector can be used to reflect the electron conduction capability of the negative electrode sheet. Generally, the greater the cohesive force between the negative electrode film and the negative current collector, the better the electron conduction capability of the negative electrode sheet, the easier the charge exchange reaction between active ions and electrons on the surface of the negative active substance, that is, the smaller the charge exchange impedance between active ions and electrons.

However, the optimization of the above parameters by itself has a great limitations to achieve long cycle life, high energy density, fast charging and other performances at the same time, because the different parameters of the negative electrode sheet have different influence on the cycle life, energy density and fast charging ability of the battery. Through extensive research, the inventors found that, when the specific surface area a of the negative electrode film, the compaction density b of the negative electrode film, and the cohesive force c between the negative electrode film and the negative current collector satisfy: $0.3 \leq a \times (1.1/b + 0.02 \times c) \leq 6.0$, the secondary battery can be guaranteed to have good dynamics performance and cycle performance without sacrificing energy density.

In some embodiments of the present application, the lower limit of $a \times (1.1/b + 0.02 \times c)$ may be 0.3, 0.4, 0.5, 0.6, 0.7, 0.8, 0.9, 1.0, and the upper limit of $a \times (1.1/b + 0.02 \times c)$ may be 0.8, 0.9, 1.0, 1.2, 1.4, 1.6, 1.8, 2.0, 2.2, 2.4, 2.6, 2.8, 3.0, 3.5, 4.0, 4.5, 5.0, 5.5, 6.0. Optionally, the negative electrode sheet satisfies: $0.6 \leq a \times (1.1/b + 0.02 \times c) \leq 3.5$.

When $0.3 \leq a \times (1.1/b + 0.02 \times c) \leq 6.0$, the pore channel structure of the negative porous electrode is well-developed but not loose, and the negative electrode film can provide enough channels for lithium intercalation, the cohesive force between the negative electrode film and the negative current collector can ensure the excellent electron conductivity capability of the negative electrode sheet, therefore the liquid phase conduction resistance of the active ions in the pore channel of the negative porous electrode is small, and the charge exchange impedance of the active ions and electrons on the surface of the negative active substance is small. The negative electrode sheet has good dynamics performance at this time, thereby ensuring that the battery has good dynamics performance and cycle performance without sacrificing energy density.

If $a \times (1.1/b + 0.02 \times c)$ is less than 0.3, it may be because the compaction density of the negative electrode film is larger, resulting in small and few pore channels of the negative porous electrode, the electrolyte cannot fully infiltrate the negative electrode film, and the liquid phase conduction resistance of the active ions inside the pore channels of the negative porous electrode is larger; or because the specific surface area of the negative electrode film is smaller, the electrolyte cannot fully contact the negative active substance, resulting in less lithium intercalation channels provided by the negative electrode film; or because the cohesive force between the negative electrode film and the current collector is too small to ensure the good electronic conductivity of the negative electrode sheet, and the charge exchange impedance of active ions and electrons on the surface of the negative active substance is large; or because of the superimposition effect of the above unfavorable factors, the liquid phase conduction impedance of the active ions in the pore channels of the negative porous electrode is large, and the charge exchange impedance of active ions and electrons on the surface of the negative active substance is large. At this time, the dynamics performance of the negative electrode sheet is very poor, affected by which, the dynamics performance and cycle performance of the battery are also poor.

If $a \times (1.1/b + 0.02 \times c)$ is greater than 6.0, it may be because the compaction density of the negative electrode film is small, resulting in larger and more pore channels of the negative porous electrode, which makes the negative electrode film too loose; or because the larger specific surface area; or because the stronger cohesive effect between the negative electrode film and the negative current collector; or because of the superimposed effect of the above unfavorable factors. Although the liquid phase conduction resistance of the active ions in the pore channels of the negative porous electrode is smaller at this time, the energy density of the battery would also be smaller because the negative electrode film is too loose; secondly, because the specific surface area of the negative electrode film is larger, and the contact area of the electrolyte with the negative active substance is larger, although the negative electrode film can provide sufficient lithium intercalation channels, the probability of side reactions between the electrolyte and the negative active substance is higher. Especially the side reactions increase severely during the rapid charging of the battery, so that the cycle performance of the battery is also poor, especially the high temperature cycle performance of the battery is very poor; thirdly, because of the strong cohesive effect between the negative electrode film and the negative current collector, there is a possibility that the negative electrode film contains more binder or the binder spreads over a larger area on the surface of the negative active substance and the negative current collector, which is not conducive to the electron conduction of the negative electrode sheet, and the charge exchange impedance of active ions and electrons on the surface of the negative active substance is instead greater, the dynamics performance of the negative electrode sheet will also be poorer, and the dynamics performance of the battery will also perform poorly under its influence.

In the negative electrode sheet of the present application, optionally, the specific surface area a of the negative electrode film satisfies 0.3 $m^2/g$ optionally, the specific surface area a of the negative electrode film satisfies 0.8 $m^2/g$. The larger the specific surface area of the negative electrode film, the more opportunities for the electrolyte to contact with the surface of the negative active substance, the more intercalation channels for active ions, the easier the active ion intercalation process, and the better dynamics performance of the battery. However, at the same time, the probability of side reactions between the electrolyte and the negative active substance is also higher, which may affect the improvement of the cycle performance of the battery. Therefore, when the specific surface area of the negative electrode film falls within the above preferred range, the dynamics performance of the battery can be better improved meanwhile ensuring the advantage of long cycle life of the battery.

In the negative electrode sheet of the present application, optionally, the compaction density b of the negative electrode film satisfies 0.8 $g/cm^3$ b 2.0 $g/cm^3$; optionally, the compaction density b of the negative electrode film satisfies $1.0 \text{ g/cm}^3 \leq b \leq 1.6 \text{ g/cm}^3$. The smaller the compaction density of the negative electrode film, the more and larger the pores of the negative porous electrode, the easier the electrolyte entering the pore channels of the negative porous electrode, and the smaller the conduction resistance of active ions from the surface of the negative porous electrode to the inside of the pore channels of the negative porous electrode, the better dynamics performance battery can have. However, when the compaction density of the negative electrode film is small, the energy density of the battery will be low, which will also affect the cohesive effect between the negative electrode film and the negative current collector and the cohesive effect between the negative active substance particles. During the battery assembly process, the risk of the negative electrode film falling off becomes higher, which may affect the improvement of the dynamics performance and cycle performance of the battery, and may even cause a safety accident. Therefore, when the compaction density of the negative electrode film falls within the above preferred range, the dynamics performance of the battery can be better improved, at the same time, the electrolyte retention capacity of the negative electrode film will be better, and the growth of the liquid phase conduction impedance of the active ions can be slowed down, so that the cycle performance of the battery can also be further improved.

In the negative electrode sheet of the present application, the greater the cohesive force between the negative electrode film and the negative current collector, the better the conductivity of electrons pass through the negative current collector and reach the negative electrode film, the faster the charge exchange rate of the active ions and electrons on the surface of the negative active substance, and the better the dynamics performance of the battery. However, when the cohesive force between the negative electrode film and the negative current collector is too strong, there may be a possibility that the binder content in the negative electrode film is too high or the spreading area of the binder on the surface of the negative active substance and the negative current collector is too large, which is not conducive for the electronic conduction of the negative electrode sheet, and the dynamics performance of the battery can also be worse; at the same time, the improvement on the energy density of the battery may also be affected by the increase of the binder content in the negative electrode film. Optionally, the cohesive force c between the negative electrode film and the negative current collector satisfies $1 \text{ N/m} \leq c \leq 20 \text{ N/m}$; optionally, the cohesive force c between the negative electrode film and the negative current collector satisfies $2 \text{ N/m} \leq c \leq 10 \text{ N/m}$.

It should be noted that when the coating weight per unit area of the negative electrode is constant, the cohesive force between the negative electrode film and the negative current collector is related to the binder content in the negative electrode film, the type of binder, and the compaction density of the negative electrode film and other factors, and people skilled in the art can choose a well-known method to adjust the cohesive force between the negative electrode film and the negative current collector according to the actual situation.

In the negative electrode sheet of the present application, the porosity of the negative electrode film also affects the performance of the battery. The greater the porosity of the negative electrode film, the better the infiltration of the electrolyte to the negative electrode film, the smaller the conduction resistance of active ions from the surface of the negative porous electrode to the inside of the pore channels of the negative porous electrode, and the better the dynamics performance of the battery. However, when the porosity of the negative electrode film increases, it is not conducive to improve the energy density of the battery. Optionally, the porosity P of the negative electrode film satisfies $20\% \leq P \leq 55\%$; optionally, the porosity P of the negative electrode film satisfies $25\% \leq P \leq 40\%$. When the porosity of the negative electrode film falls within the above preferred range thereof, it can be ensured that the battery has a higher energy density and the dynamics performance is further improved.

In the negative electrode sheet of the present application, the type of the negative active substance is not specifically limited, and can be selected according to actual needs. Optionally, the negative active substance can be one or more selected from carbon material, silicon-based material, tin-based material, and lithium titanate. The carbon material can be one or more selected from graphite, soft carbon, hard carbon, carbon fiber, and mesocarbon microspheres; the graphite can be one or more selected from artificial graphite and natural graphite; the silicon-based material can be one or more selected from elemental silicon, silicon-oxygen compound, silicon-carbon composite, and silicon alloy; the tin-based material can be one or more selected from elemental tin, tin oxide compound, and tin alloy. Optionally, the negative active substance is one or more selected from carbon materials and silicon-based materials.

In the negative electrode sheet of the present application, the negative electrode film can be provided on one surface of the negative current collector or on both surfaces of the negative current collector. The negative electrode film may further include a conductive agent and a binder, where the type and content of the conductive agent and the binder are not specifically limited, and can be selected according to actual requirements. The type of the negative current collector is also not specifically limited, and can be selected according to actual needs, optionally copper foil can be used.

It should be noted that when the negative electrode film is provided on both surfaces of the negative current collector, as long as the negative electrode film on either of the surfaces satisfies the present application, it is considered that the negative plate falls within the protection scope of the present application. At the same time, the parameters of each negative electrode film given in the present application also refer to the parameters of a single-sided negative electrode film.

Next, a secondary battery according to the second aspect of the present application will be described, which comprises the negative electrode sheet of the first aspect of the present application.

The secondary battery of the second aspect of the present application further comprises a positive electrode sheet, an electrolyte, and an isolation film.

In the secondary battery of the present application, the positive electrode sheet comprises a positive current collector and a positive electrode film provided on at least one surface of the positive current collector and comprising a positive active material. The type and specific composition of the positive electrode sheet are not specifically limited and can be selected based on actual demands. The positive electrode film can be provided on one of the surfaces of the positive current collector or the positive electrode film can be provided on both surfaces of the positive current collector. The positive electrode film may further comprise a conductive agent and a binder, the types and the contents of the conductive agent and the binder are not specifically limited, and may be selected based on actual demands. The type of the positive current collector is not specifically limited, and may be selected based on actual needs, optionally aluminum foil can be used.

In the secondary battery of the present application, the active ions are firstly de-intercalated from the positive electrode and then intercalated into the negative electrode during charging. In this process, it is very important to match the ease or complexity of de-intercalation and intercalation of the active ions. If the dynamics performance of the positive electrode is much higher than the dynamics performance of the negative electrode, the active ions can be quickly de-intercalated from the positive electrode, but the negative electrode lacks the capability of quick intercalation. At this time, if high-rate charging is used, the active ions are easily precipitated on the surface of the negative electrode, thus affecting the cycle performance of the battery; if the dynamics performance of the positive electrode is much lower than the dynamics performance of the negative electrode, that is, the negative electrode has the capability of quick intercalation of the active ions, but the active ions are slowly de-intercalated from the positive electrode. At this time, if high-rate charging is used, although the active ions may not be directly reduced and precipitate on the surface of the negative electrode, the charging time is longer when the battery is fully charged, and the battery actually does not have good dynamics performance. Therefore, the matching of positive and negative dynamics performance is also very crucial to the improvement of the dynamics performance of the battery.

The inventors researched and found that the positive and negative dynamics performance are highly correlated with the porosity of the negative electrode film and the resistance per unit area of the positive electrode sheet. After a lot of research, the inventors found that when the secondary battery satisfies $0.10 \leq P/(2-R \times 0.9) \leq 0.30$, the dynamics performance and cycle performance of the battery can be further improved. P is the porosity of the negative electrode film; R is the resistance per unit area of the positive electrode sheet, and a unit is $\Omega/cm^2$ thereof.

In some embodiments of the present application, the lower limit of $P/(2-R \times 0.9)$ may be 0.10, 0.11, 0.12, 0.13, 0.14, 0.15, 0.16, and the upper limit of $P/(2-R \times 0.9)$ may be 0.14, 0.15, 0.16, 0.17, 0.18, 0.19, 0.20, 0.21, 0.22, 0.23, 0.24, 0.25, 0.26, 0.27, 0.28, 0.29, 0.30. Optionally, the secondary battery satisfies $0.11 \leq P/(2-R \times 0.9) \leq 0.25$.

In the secondary battery of the present application, in order to further improve the dynamics performance of the battery, optionally, the resistance R per unit area of the positive electrode sheet satisfies $0.02\ \Omega/cm^2 \leq R \leq 1.20\ \Omega/cm^2$; optionally, the resistance R per unit area of the positive electrode sheet satisfies $0.08\ \Omega/cm^2 \leq R \leq 0.60\ \Omega/cm^2$. The smaller the resistance per unit area of the positive electrode sheet, the stronger the electron conductivity between the positive active material particles and between the positive electrode film and the positive current collector, the better the dynamics performance of the positive electrode sheet, the shorter the time required for the battery to be fully charged, the better the dynamic performance of the battery. However, the resistance per unit area of the positive electrode sheet should not be too small, due to the influence of the good dynamics of the positive electrode during charging, the negative electrode potential can easily reach below 0V, resulting in lithium precipitation, which may ultimately affect the improvement on the dynamics performance of the battery.

In the secondary battery of the present application, the positive active material may optionally be one or more selected from lithium cobalt oxide, lithium nickel oxide, lithium manganese oxide, lithium nickel manganese oxide, lithium nickel cobalt manganese oxide, lithium nickel cobalt aluminum oxide, and olivine-type lithium-containing phosphates. Optionally, the positive active material can be specifically one or more selected from $LiCoO_2$, $LiNiO_2$, $LiMnO_2$, $LiMn_2O_4$, $LiNi_{1/3}Co_{1/3}Mn_{1/3}O_2$ (NCM333), $LiNi_{0.5}Co_{0.2}Mn_{0.3}O_2$ (NCM523), $LiNi_{0.6}Co_{0.2}Mn_{0.2}O_2$ (NCM622), $LiNi_{0.8}Co_{0.1}Mn_{0.1}O_2$ (NCM811), $LiNi_{0.85}Co_{0.15}Al_{0.05}O_2$, $LiFePO_4$ (LFP) and $LiMnPO_4$.

In the secondary battery of the present application, the isolation film is provided between the positive electrode sheet and the negative electrode sheet and plays a role of isolation. The type of the isolation film is not specifically limited, the isolation film can be any isolation films used in existing batteries, for example, the isolation film may be a polyethylene membrane, a polypropylene membrane, a polyvinylidene fluoride membrane and a multilayer composite membrane thereof, but the present disclosure is not limited thereto.

In the secondary battery of the present application, the electrolyte comprises an electrolyte salt and an organic solvent, the specific type of the electrolyte salt and the organic solvent are not specifically limited, and may be selected based on actual demands. The electrolyte may also comprise an additive, and the type of the additive is not specifically limited. The additive may be a negative electrode film-forming additive; the additive may also be a positive electrode film-forming additive; the additive may also be an additive used for improving one certain performance of the battery, such as an additive used for improving the overcharge performance of the battery, an additive used for improving the high-temperature performance of the battery, an additive used for improving the low-temperature performance of the battery and the like.

Hereinafter, the application will be further described in combination with specific embodiments. It should be understood that the embodiments are only used for explaining the application and are not intended to limit the scope of the present application.

Example 1

(1) Preparation of a Positive Electrode Sheet

Mixing the positive electrode active material (see Table 1 for details), the conductive agent Super P and the binder polyvinylidene fluoride (PVDF) in a certain mass ratio, adding the solvent N-methylpyrrolidone (NMP), and stirring under the action of a vacuum mixer until the system is homogeneous to obtain a positive electrode slurry; the positive electrode slurry is evenly coated on the two surfaces of the positive current collector aluminum foil, dried at room temperature and transferred to the oven to continue drying, and then cold pressed and slit to obtain the positive electrode sheet.

(2) Preparation of the Negative Electrode Sheet

Mixing the negative active substance (see table 1 for detail), conductive agent Super P, thickener carboxymethyl cellulose (CMC) and binder styrene butadiene rubber (SBR) according to a certain mass ratio, adding solvent deionized water, mixing under the action of a vacuum mixer until the system was homogeneous to obtain a negative slurry; then the negative slurry was uniformly coated on two surfaces of a copper foil (negative current collector), dried at room temperature and transferred to the oven to continue drying, and then cold pressed and slit to obtain the negative electrode sheet.

(3) Preparation of the Electrolyte

Mixing ethylene carbonate (EC), ethyl methyl carbonate (EMC) and diethyl carbonate (DEC) according to a volume ratio of 1:1:1 together to obtain an organic solvent, then LiPF6, a well-dried lithium salt, was dissolved into the mixed organic solvent to prepare an electrolyte at a concentration of 1 mol/L.

(4) Preparation of the Isolation Film

A polyethylene membrane was selected as the isolation film.

(5) Preparation of the Battery

Stacking the positive electrode sheet, the isolation film, and the negative electrode sheet in order, the isolation film was positioned between the positive electrode sheet and the negative electrode sheet to play the role of isolation, then winding to form a bare cell; placing the bare cell into an outer packaging shell, and injecting the electrolyte after drying, after vacuum encapsulation, standing, chemical formation, shaping and the like, a battery was obtained.

Batteries of examples 2-27 and comparative examples 1-6 were prepared according to a method similar to that of example 1, and the specific differences were shown in table 1.

TABLE 1

Parameters of examples 1-27 and examples 1-6

| | Positive active material | Resistance R per unit area of the positive electrode sheet ($\Omega/cm^2$) | Negative active substance | Specific surface area a of negative electrode film ($m^2/g$) | The compaction density b of the negative electrode film ($g/cm^3$) | The cohesive force c between the negative electrode film and the negative current collector (N/m) | Porosity P of negative electrode film |
|---|---|---|---|---|---|---|---|
| Example 1 | LFP | 0.1 | graphite | 0.3 | 1.4 | 13 | 25% |
| Example 2 | LFP | 0.1 | graphite | 0.5 | 1 | 2 | 32% |
| Example 3 | LFP | 0.1 | graphite | 0.8 | 2 | 14 | 20% |
| Example 4 | LFP | 0.1 | graphite | 1.5 | 1.6 | 10 | 33% |
| Example 5 | LFP | 0.1 | graphite | 2.5 | 1.4 | 5 | 40% |
| Example 6 | LFP | 0.1 | graphite | 3 | 1.5 | 8 | 35% |
| Example 7 | LFP | 0.1 | graphite | 3.5 | 1.8 | 15 | 22% |
| Example 8 | LFP | 0.1 | graphite | 4 | 1.5 | 10 | 34% |
| Example 9 | LFP | 0.1 | graphite | 4.8 | 1.4 | 4 | 46% |
| Example 10 | LFP | 0.1 | graphite | 5.4 | 1.3 | 5 | 47% |
| Example 11 | LFP | 0.1 | graphite | 6 | 1.15 | 1 | 50% |
| Example 12 | LFP | 0.1 | graphite | 2.1 | 0.8 | 1.5 | 55% |
| Example 13 | LFP | 0.1 | graphite | 4.3 | 1.8 | 20 | 25% |
| Example 14 | LFP | 0.02 | graphite | 0.8 | 2 | 14 | 20% |
| Example 15 | LFP | 0.05 | graphite | 0.8 | 2 | 14 | 20% |
| Example 16 | LFP | 0.08 | graphite | 0.8 | 2 | 14 | 20% |
| Example 17 | LFP | 0.6 | graphite | 3 | 1.5 | 8 | 35% |
| Example 18 | LFP | 0.7 | graphite | 3 | 1.5 | 8 | 35% |
| Example 19 | LFP | 1.1 | graphite | 3 | 1.5 | 8 | 35% |
| Example 20 | LFP | 1.2 | graphite | 3 | 1.5 | 8 | 35% |
| Example 21 | LFP | 0.1 | graphite | 3.5 | 0.7 | 5 | 38% |
| Example 22 | LFP | 0.1 | graphite | 6.5 | 1.6 | 8 | 37% |
| Example 23 | LFP | 0.1 | graphite | 4 | 1.3 | 21 | 35% |
| Example 24 | LFP | 0.1 | hard carbon | 3.3 | 0.8 | 15 | 42% |
| Example 25 | LFP | 0.1 | hard carbon | 0.4 | 1.2 | 2 | 28% |
| Example 26 | NCM811 | 0.4 | mixture of graphite and silicon oxide with a mass ratio of 7:3 | 4.8 | 1.2 | 15 | 39% |
| Example 27 | NCM811 | 0.4 | mixture of graphite and silicon oxide with a mass ratio of 7:4 | 0.45 | 1.6 | 8 | 25% |
| Comparative example 1 | LFP | 0.1 | graphite | 4.8 | 1.1 | 17 | 41% |
| Comparative example 2 | LFP | 0.1 | graphite | 0.4 | 1.6 | 2 | 24% |
| Comparative example 3 | LFP | 0.1 | hard carbon | 5.5 | 1 | 3 | 43% |
| Comparative example 4 | LFP | 0.1 | hard carbon | 0.3 | 1.3 | 2 | 26% |

TABLE 1-continued

Parameters of examples 1-27 and examples 1-6

| | Positive active material | Resistance R per unit area of the positive electrode sheet ($\Omega/cm^2$) | Negative active substance | Specific surface area a of negative electrode film ($m^2/g$) | The compaction density b of the negative electrode film ($g/cm^3$) | The cohesive force c between the negative electrode film and the negative current collector (N/m) | Porosity P of negative electrode film |
|---|---|---|---|---|---|---|---|
| Comparative example 5 | NCM811 | 0.4 | mixture of graphite and silicon oxide with a mass ratio of 7:3 | 5.6 | 1.1 | 6 | 45% |
| Comparative example 6 | NCM811 | 0.4 | mixture of graphite and silicon oxide with a mass ratio of 7:4 | 0.4 | 1.7 | 3 | 19% |

Each of the parameters involved in the electrode sheet of the present application and performance parameters of the battery can be tested according to the following methods, or according to other methods known in the art, and the obtained test results are all within the error range:

1. Electrode Sheet Parameter Test:

(1) The Specific Surface Area of the Negative Electrode Film

The specific surface area of the negative electrode film can be tested with reference to the national standard GB/T 19587-2004 for the determination the specific surface area of solid materials by gas adsorption BET method.

(2) The Compaction Density of Negative Electrode Film

The compaction density of the negative electrode film=the mass per unit area of the negative electrode film/the thickness of the negative electrode film. The mass per unit area of the negative electrode film can be measured by a standard balance, and the thickness of the negative electrode film can be measured by a tenthousandth micrometer.

(3) The Cohesive Force Between the Negative Electrode Film and the Negative Current Collector The cohesive force between the negative electrode film and the negative current collector test can refer to the national standard GB/T 2790-1995 adhesives 180° peel strength test method. The specific test can be carried out by using a high iron puller to test the 180° peeling force at a peeling speed of 50 mm/min. The average peel strength collected when the negative electrode film with a length of 60 mm is completely peeled from the negative current collector is taken as the cohesive force between t between the negative electrode film and the negative current collector.

(4) Porosity of Negative Electrode Film

The porosity of the negative electrode film is measured by the gas displacement method, and specifically refer to the national standard GB/T24586-2009 for the determination of the apparent density, true density and porosity of iron ore. Porosity $P=(V_1-V_2)/V_1\times100\%$, $V_1$ represents the apparent volume, and $V_2$ represents the real volume.

(5) Resistance Per Unit Area of Positive Electrode Sheet

The test uses the four-terminal AC method of HIOKI internal resistance tester. The diameter of the test terminal is 14 mm, the test pressure is 25 MPa, and the sampling time is 15 s. After the current is loaded, the voltage can be measured. The resistance per unit area of the positive electrode sheet=voltage/current/area of the test terminal.

2. Battery Performance Test:

(1) Test of the Dynamics Performance

At 25° C., the batteries prepared in the examples and comparative examples were fully charged at xC and then fully discharged at 1 C for 10 cycles, then the batteries were fully charged at xC, and then the negative electrode sheets were disassembled and the lithium precipitation on the surface of each negative electrode sheet was observed. If there was no lithium precipitation on the cathode surface, the test process was repeated with a charging rate xC increased in increments of 0.1 C, until the surface of the negative electrode was lithium precipitated and the test process was stopped. At this time, the charging ratexC minus 0.1 C was the maximum charging rate of the battery.

Then, at 25° C., the batteries prepared in the examples and comparative examples were charged to the cut-off voltage with constant current at the maximum charging rate above, and then constant voltage charged to 0.05 C at this voltage. Record the total time of charging under constant current and constant voltage.

If the total time is less than 40 min, the dynamics performance of the battery is considered to be excellent; if the total time is greater than or equal to 40 min and less than or equal to 50 min, the dynamics performance of the battery is considered to be good; if the total time is greater than 50 min, the dynamics performance of the battery is considered to be poor.

(2) Test of the Cycle Performance

At 25° C., the batteries prepared in the examples and comparative examples were charged at 1.6 C rate, discharged at 1 C rate, and the fully charging and discharging process was repeated until the capacity of the battery decayed to 80% of the initial capacity, and the cycle number of the battery was recorded.

(3) Test of the Actual Energy Density

At 25° C., the batteries prepared in the examples and the comparative examples were fully charged at 1 C rate and fully discharged at 1 C rate, the actual discharge energy was recorded at this time; at 25° C., the batteries were weighed by an electronic balance. And a ratio of the actual discharge capacity of the battery discharged at 1 C to the weight of the battery is the actual energy density of the battery.

When the actual energy density was less than 80% of the targeted energy density, the actual energy density of the battery was considered to be very low; when the actual energy density was more than or equal to 80% of the targeted energy density and less than 95% of the targeted energy density, the actual energy density of the battery was considered to be lower; when the actual energy density was more than or equal to 95% of the targeted energy density and less than 105% of the targeted energy density, the actual energy density of the battery was considered to be moderate; when the actual energy density was more than or equal to 105% of the targeted energy density and less than 120% of the targeted energy density, the actual energy density of the battery was considered to be higher; when the actual energy density was more than 120% of the targeted energy density, the actual energy density of the battery was considered to be very high.

The test results of each example and comparative example are shown in table 2.

From the test results in table 2, it can be seen that the negative electrode sheets in the batteries of examples 1-27 all satisfy $0.3 \leq a \times (1.1/b + 0.02 \times c) \leq 6.0$, and the structure of the pore channels of the porous electrode was well-developed but not loose. The negative electrode film can provide enough channels for lithium intercalation, and the cohesive force between the negative electrode film and the negative current collector can ensure the excellent electron conductivity of the negative electrode sheet, so the liquid phase conduction resistance of lithium ions inside the pore channels of the negative porous electrode was smaller, the charge exchange impedance of lithium ions and electrons on the surface of the negative active substance was smaller, therefore the negative electrode sheet had good dynamics performance and high volume energy density, which can make the battery have good dynamics performance and cycle performance without sacrificing energy density.

Compared with examples 1-27, in comparative examples 1-6, $a \times (1.1/b + 0.02 \times c)$ is not in the given range, and the battery cannot balance dynamics performance, cycle performance and energy density at the same time.

Furthermore, under the premise that the negative electrode sheet has good dynamics performance, by reasonably matching the dynamics performance of the positive electrode and negative electrode, the battery can satisfy $0.10 \leq P/$

TABLE 2

Test results of examples 1-27 and comparative examples 1-6

| | | | dynamics performance | | | |
|---|---|---|---|---|---|---|
| | $a \times (1.1/b + 0.02 \times c)$ | $P/(2 - R \times 0.9)$ | Maximum charging rate | Full charge performance | Cycle number of 1.6C | Actual energy density |
| Example 1 | 0.31 | 0.131 | 1.8C | excellent | 3320 | moderate |
| Example 2 | 0.57 | 0.168 | 1.8C | excellent | 3134 | moderate |
| Example 3 | 0.66 | 0.105 | 2.0C | excellent | 3628 | higher |
| Example 4 | 1.33 | 0.173 | 2.2C | excellent | 4839 | moderate |
| Example 5 | 2.21 | 0.209 | 2.5C | excellent | 4678 | moderate |
| Example 6 | 2.68 | 0.183 | 2.5C | excellent | 5215 | moderate |
| Example 7 | 3.19 | 0.115 | 2.1C | excellent | 5809 | moderate |
| Example 8 | 3.73 | 0.178 | 2.3C | excellent | 5335 | moderate |
| Example 9 | 4.16 | 0.241 | 2.2C | excellent | 4276 | moderate |
| Example 10 | 5.11 | 0.246 | 2.2C | excellent | 3320 | moderate |
| Example 11 | 5.86 | 0.262 | 1.8C | excellent | 2976 | moderate |
| Example 12 | 2.95 | 0.288 | 1.8C | excellent | 3020 | moderate |
| Example 13 | 4.35 | 0.131 | 1.7C | excellent | 3521 | moderate |
| Example 14 | 0.66 | 0.101 | 1.6C | good | 2714 | higher |
| Example 15 | 0.66 | 0.102 | 1.8C | excellent | 2821 | higher |
| Example 16 | 0.66 | 0.104 | 2.0C | excellent | 3403 | higher |
| Example 17 | 2.68 | 0.24 | 2.6C | good | 5263 | moderate |
| Example 18 | 2.68 | 0.255 | 2.8C | good | 5328 | moderate |
| Example 19 | 2.68 | 0.347 | 3.0C | poor | 5407 | moderate |
| Example 20 | 2.68 | 0.38 | 3.3C | poor | 5412 | moderate |
| Example 21 | 5.85 | 0.199 | 2.5C | excellent | 4676 | moderate |
| Example 22 | 5.51 | 0.194 | 2.5C | excellent | 3745 | moderate |
| Example 23 | 5.06 | 0.183 | 2.1C | excellent | 5608 | moderate |
| Example 24 | 5.53 | 0.22 | 3.0C | excellent | 6081 | moderate |
| Example 25 | 0.38 | 0.147 | 2.6C | excellent | 4764 | moderate |
| Example 26 | 5.84 | 0.238 | 3.0C | excellent | 1609 | moderate |
| Example 27 | 0.38 | 0.152 | 1.8C | excellent | 1512 | higher |
| Comparative example 1 | 6.43 | 0.215 | 1.4C | poor | 375 | lower |
| Comparative example 2 | 0.29 | 0.126 | 1.2C | poor | 242 | moderate |
| Comparative example 3 | 6.38 | 0.225 | 2.6C | excellent | 357 | moderate |
| Comparative example 4 | 0.27 | 0.136 | 1.3C | poor | 308 | moderate |
| Comparative example 5 | 6.27 | 0.274 | 2.8C | excellent | 234 | moderate |
| Comparative example 6 | 0.28 | 0.116 | 1.2C | poor | 214 | higher |

(2−R×0.9)≤0.30, and the dynamics performance and the cycle performance of the battery can be further improved, because the difficulty of lithium ions de-intercalation and intercalation during battery charging is more matched. It can be seen from the test results in table 2 that the overall performance of examples 1-18 is better than that of examples 19-20.

Furthermore, the specific surface area a of the negative electrode film is preferred to be 0.3 m$^2$/g~6.0 m$^2$/g. Within the above preferred range, the dynamics performance of the battery can be better improved while ensuring the advantage of long cycle life of the battery. The compaction density b of the negative electrode film is preferred to be 0.8 g/cm$^3$~2.0 g/cm$^3$. Within the above preferred range, the dynamics performance of the battery can be better improved while ensuring the advantages of high energy density of the battery, while the electrolyte retention capacity of the negative electrode sheet can be also better, the interface charge transfer impedance between the negative active substance and the electrolyte can also be lower, and the battery cycle performance can be further improved. The cohesive force c between the negative electrode film and the negative current collector is preferred to be 1 N/m~20 N/m. Within the above preferred range, the negative electrode sheet can have good electron conductivity, and the charge exchange rate between lithium ions and electrons on the surface of the negative active substance is faster, and the lithium ions can be more easily intercalated into the bulk phase of the negative active substance.

However, when one or more of the specific surface area a of the negative electrode film, the compaction density b of the negative electrode sheet, and the cohesive force c between the negative electrode film and the negative current collector fail to meet the above preferred range, as long as satisfying 0.3≤a×(1.1/b+0.02×c)≤6.0 is guaranteed, in combination with examples 21-23, the battery can still have good dynamics performance and cycle performance without sacrificing energy density.

It can be seen from examples 24-27 and comparative examples 3-6 that when the battery uses different positive and negative active substance, as long as the negative electrode sheet satisfies 0.3≤a×(1.1/b+0.02×c)≤6.0, the battery still can have good dynamics performance and cycle performance without sacrificing energy density.

According to the foregoing disclosure and teachings of the present specification, a person skilled in the art can also make variations and modifications to the above implementing manners. Therefore, the present application is not limited to the specific implementing manners disclosed and described above, modifications and variations of the present application should also fall within the protection scope of the claims of the present application. Furthermore, although specific terminologies are used in the present specification, these terminologies are merely for convenience of description, and are not intended to limit the present application.

The invention claimed is:

1. A secondary battery, comprising a negative electrode sheet, wherein the negative electrode sheet comprises:
 a negative current collector and a negative electrode film provided on at least one surface of the negative current collector and comprising a negative active substance;
 wherein
 the negative electrode sheet further satisfies 0.3≤a×(1.1/b+0.02×c)≤6.0;
 wherein
 a represents a specific surface area of the negative electrode film, and a unit is m$^2$/g;
 b represents compaction density of the negative electrode film, and a unit is g/cm$^3$; and
 c represents cohesive force between the negative electrode film and the negative current collector, and a unit is N/m.

2. The secondary battery according to claim 1, wherein the negative electrode sheet satisfies 0.6≤a×(1.1/b+0.02×c)≤3.5.

3. The secondary battery according to claim 1, wherein the specific surface area a of the negative electrode film satisfies 0.3 m$^2$/g≤a≤6.0 m$^2$/g.

4. The secondary battery according to claim 1, wherein the specific surface area a of the negative electrode film satisfies 0.8 m$^2$/g≤a≤3.5 m$^2$/g.

5. The secondary battery according to claim 1, wherein the compaction density b of the negative electrode film satisfies 0.8 g/cm$^3$≤b≤2.0 g/cm$^3$.

6. The secondary battery according to claim 1, wherein the compaction density b of the negative electrode film satisfies 1.0 g/cm$^3$≤b≤1.6 g/cm$^3$.

7. The secondary battery according to claim 1, wherein the cohesive force c between the negative electrode film and the negative current collector satisfies 1 N/m≤c≤20 N/m.

8. The secondary battery according to claim 1, wherein the cohesive force c between the negative electrode film and the negative current collector satisfies 2 N/m≤c≤10 N/m.

9. The secondary battery according to claim 1, wherein a porosity P of the negative electrode film satisfies 20%≤P≤55%.

10. The secondary battery according to claim 1, wherein a porosity P of the negative electrode film satisfies 25%≤P≤40%.

11. The secondary battery according to claim 1, wherein:
 the negative active substance is one or more selected from carbon material, silicon-based material, tin-based material and lithium titanate.

12. The secondary battery according to claim 1, wherein:
 the negative active substance is one or more selected from the carbon material and the silicon-based material.

13. The secondary battery according to claim 1, wherein the battery further comprises a positive electrode sheet, comprising a positive current collector and a positive electrode film provided on at least one surface of the positive current collector and comprising a positive active material, and the secondary battery further satisfies 0.10≤P/(2−R×0.9)≤0.30;
 wherein
 P is a porosity of the negative electrode film; and
 R is resistance per unit area of the positive electrode sheet, and a unit is Ω/cm$^2$.

14. The secondary battery according to claim 13, wherein, the resistance R per unit area of the positive electrode sheet satisfies 0.02 Ω/cm$^2$≤R≤1.20 Ω/cm$^2$.

15. The secondary battery according to claim 13, wherein the resistance R per unit area of the positive electrode sheet satisfies 0.08 Ω/cm$^2$≤R≤0.60 Ω/cm$^2$.

16. The secondary battery according to claim 13, wherein the positive active material is one or more selected from lithium cobalt oxide, lithium nickel oxide, lithium manganese oxide, lithium nickel manganese oxide, lithium nickel cobalt manganese oxide, lithium nickel cobalt aluminum oxide, and olivine-type lithium-containing phosphate.

17. The secondary battery according to claim 1, wherein the battery further comprises a positive electrode sheet, comprising a positive current collector and a positive electrode film provided on at least one surface of the positive current collector and comprising a positive active material, and the secondary battery further satisfies $0.11 \leq P/(2-R \times 0.9) \leq 0.25$;

wherein

P is a porosity of the negative electrode film; and

R is resistance per unit area of the positive electrode sheet, and a unit is $\Omega/cm^2$.

18. The secondary battery according to claim 17, wherein the resistance R per unit area of the positive electrode sheet satisfies $0.02 \ \Omega/cm^2 \leq R \leq 1.20 \ \Omega/cm^2$.

19. The secondary battery according to claim 17, wherein the resistance R per unit area of the positive electrode sheet satisfies $0.08 \ \Omega/cm^2 \leq R \leq 0.60 \ \Omega/cm^2$.

20. The secondary battery according to claim 17, wherein the positive active material is one or more selected from lithium cobalt oxide, lithium nickel oxide, lithium manganese oxide, lithium nickel manganese oxide, lithium nickel cobalt manganese oxide, lithium nickel cobalt aluminum oxide, and olivine-type lithium-containing phosphate.

* * * * *